United States Patent [19]

Mathews

[11] Patent Number: 5,111,771
[45] Date of Patent: May 12, 1992

[54] EXERCISE AND AMUSEMENT DEVICE FOR PETS

[76] Inventor: Steven W. Mathews, 6967 SW. 40th St., Miramar, Fla. 33023

[21] Appl. No.: 507,661

[22] Filed: Apr. 10, 1990

Related U.S. Application Data

[63] Continuation-in-part of Ser. No. 469,928, Jan. 25, 1990, abandoned.

[51] Int. Cl.⁵ .............................................. A01K 15/00
[52] U.S. Cl. ................................... 119/29; 273/413
[58] Field of Search ............... 119/29, 29.5; 446/247; 272/76, 77, 78; 273/58 C, 413, 414

[56] References Cited

U.S. PATENT DOCUMENTS

| | | | |
|---|---|---|---|
| 1,898,817 | 2/1933 | Dole | 273/58 C |
| 2,186,016 | 1/1940 | Evans | 272/78 |
| 4,223,636 | 9/1980 | Dishong | 119/29 |
| 4,491,315 | 1/1985 | Dye | 119/29 |
| 4,499,855 | 2/1985 | Galkiewicz | 119/29 |
| 4,517,922 | 5/1985 | Lind | 119/29 |
| 4,712,510 | 12/1987 | Tae-Ho | 119/29 |
| 4,721,302 | 1/1988 | Murphy | 272/78 |
| 4,770,123 | 9/1988 | Bell | 119/29 |

Primary Examiner—Gene Mancene
Assistant Examiner—R. Thomas Price
Attorney, Agent, or Firm—Jerry A. Miller

[57] ABSTRACT

An exercise and amusement toy for a dog or other pet includes a reinforced rubber tube stuffed with a sponge rubber stuffing. A bottom panel is attached to the tube. A rope is passed through the tube and through a hole in the bottom panel and is secured with a knot. The rope is then attached to a resilient tether which is suspended from a mounting bracket, ceiling, tree limb, etc. The tube is covered with a bag made of a fur-like material which closes at the top with a draw string. In another embodiment, the body member is made of a retrieving dummy.

14 Claims, 3 Drawing Sheets

EXERCISE AND AMUSEMENT DEVICE FOR PETS

This is a continuation-in-part of U.S. patent application Ser. No. 07/469,928 filed Jan. 25, 1990, now abandoned.

BACKGROUND

1. Field of the Invention

This invention relates generally to the field of pet toys and exercise devices for pets. More particularly, this invention relates to a device for exercising and entertaining dogs and other pets.

2. Background of the Invention

Numerous toys have been devised to amuse and entertain pets such as dogs and cats. Many such devices also provide valuable exercise for the pet. Such exercise is especially important for animals that are confined to relatively small areas during the day while their masters are at work. Of course, since larger animals require more space to run and play in order to obtain adequate exercise, they may be even more prone to not getting enough exercise than smaller animals.

Although many such toys for pets exist, often larger dogs, for example 50 pounds or so and up, have little difficulty destroying the toy in their play. It is therefore desirable to provide a very durable toy that can withstand the play of larger dogs.

U.S. Pat. No. 4,712,510 to Tae-Ho discloses a pet toy with an expandable wand which is attached to a wall. The toy includes a furry body section. The toy is suspended by a tether which may be elastic. U.S. Pat. No. 4,499,855 to Galkiewicz discloses a cat toy which uses a flexible rod member to control a toy at the end of a cord. The toy itself in these patents is likely unsuitable for use by a larger dog who would either swallow it or otherwise destroy it in short order.

The present invention provides an improved pet exercise device which can withstand the rough play which might be encountered with a larger dog.

SUMMARY OF THE INVENTION

It is an object of the present invention to provide an improved exercise device for pets.

It is another object of the present invention to provide an exercise device which can withstand the play of larger dogs for reasonable duration without damage.

It is a further object of the present invention to provide a pet exercise device which can be easily repaired if damaged by the pet.

These and other objects and advantages of the invention will become apparent to those skilled in the art upon consideration of the following description of the invention.

In one aspect of the present invention, an exercise and amusement device for a pet includes a resilient body member suitable for providing resistance against chewing actions by the pet. A resilient suspending structure suspends the body member at a predetermined height, and provides elastic resistance to pulling of the body member by the pet. A removable cover covers the body member. Preferably, the cover is made of a fur-like material.

In another aspect of the present invention, a body member for a pet toy includes a hollow tube made from a flexible resilient material and having an end. A bottom panel is attached to the end. The bottom panel has an aperture for attachment of a tether. A spongy stuffing is disposed within the tube to provide resistance to compression of the tube. Preferably, a removable fur-like cover covers the body member.

In another aspect of the present invention, an exercise and amusement device for a pet, includes a cylindrical resilient body member suitable for providing resistance against chewing actions by the pet. The resilient body member includes a flexible tube, a foam stuffing within the flexible tube, and a bottom panel with an aperture coupled to the flexible tube. A first tether passes through the aperture and is fixed in relationship thereto. A resilient suspending structure includes a second resilient tether coupled to the first tether for suspending the body member at a predetermined height, and for providing elastic resistance to pulling of the body member by the pet. A removable covering is fashioned into the shape of a bag and made of a fur-like material, for covering the body member. A draw string is used for closing the bag shape around the body member.

An exercise and amusement toy for a dog or other pet according to an aspect of the present invention, includes a reinforced rubber tube stuffed with a sponge rubber stuffing. A bottom panel is attached to the tube. A rope is passed through the tube and through a hole in the bottom panel and is secured with a knot. The rope is then attached to a resilient tether which is suspended from a mounting bracket, ceiling, tree limb, etc. The tube is covered with a bag made of a fur-like material which closes at the top with a draw string.

The features of the invention believed to be novel are set forth with particularity in the appended claims. The invention itself, however, both as to organization and method of operation, together with further objects and advantages thereof, may be best understood by reference to the following description taken in conjunction with the accompanying drawing.

DETAILED DESCRIPTION OF THE INVENTION

Figure 1:
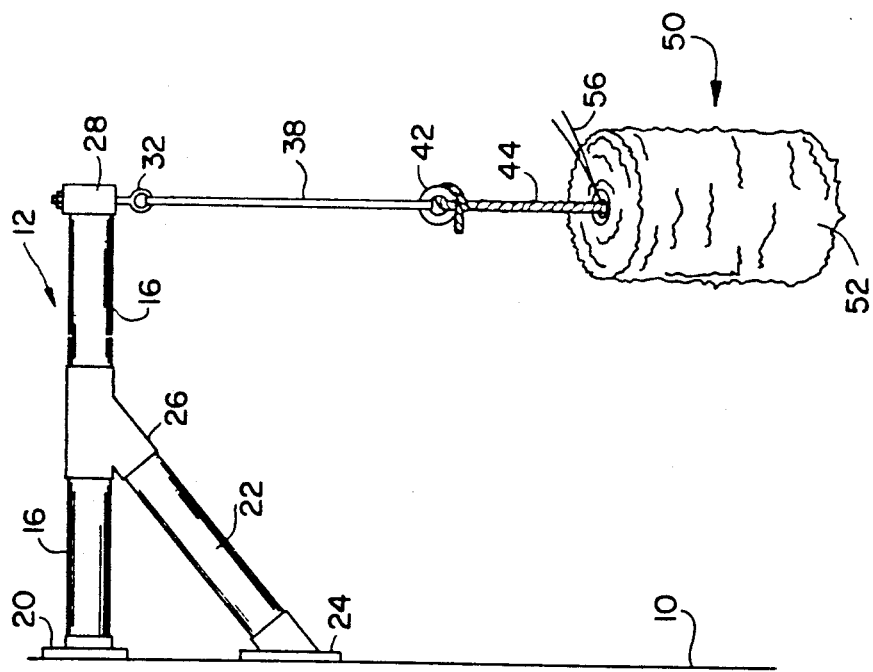
FIG. 1 shows a view of one embodiment of the present invention using a wall mounted bracket assembly.

Turning now to the drawing in which like reference numerals designate corresponding parts throughout the several figures thereof, and in particular to FIG. 1, a view of the present pet exercise device is shown mounted to a wall 10 using a wall mounting bracket assembly 12. Of course, it will be apparent that the present invention can also be mounted outside to a tree limb or post, to a ceiling using eye hooks or the like, etc. without departing from the present invention.

In one embodiment, the bracket assembly 12 can be made of PVC plastic such as schedule 80 pipe with appropriate fittings in one embodiment. In most circumstances, 1" or 1¼" diameter pipe will be satisfactory. In other embodiments, aluminum, wood, graphite and other materials may be used. In the embodiment shown, a horizontal member 16 is mounted to the wall 10 with a flange 20 using bolts or other suitable fasteners. A brace 22 is also mounted to the wall with a flange 24 and is coupled to the horizontal member using a 45 degree coupling 26. An end cap 28 may be provided at the end of horizontal member 16.

An eye bolt 32 passes through the end of the horizontal member 16 and is in turn connected to one end of a resilient tether 38. For one embodiment, which is suitable for dogs in the range of 85 pounds, about three feet of resilient tether 38 may be used. The resilient tether 38 is made of material such as that used for heavy duty rubber bungee cords having an oblong cross-section which are available at most hardware centers. An example of such cord is available from Goodyear Corporation as Trap Strap—EPDM Rubber.

The other end of the resilient tether 38 is connected, e.g. by a metal ring 42 and knot or braided loop, to a second tether 44 which is essentially not resilient and serves somewhat the same purpose as a fishing leader. Tether 44 extends upward for about a foot from the top of toy 50 in the present embodiment. Tether may be made, for example, of ¼" diameter nylon rope. It passes through a center hole of a toy 50 and is secured at the bottom by a knot or other mechanism.

The toy 50 is preferably covered with a cover 52 made of a furry material, such as for example Lorene-Dynel Synthetic Fibers available from Sm Arnold, 7901 Michigan Ave., St. Louis, Mo. 63111-3594, is sewn into the shape of a bag. This is the same material which is often used for mitts used in washing cars and is a highly durable synthetic with approximately one inch thick fur. A draw string 56 is sewn into the top of the bag to allow the cover to be removed for cleaning or replacement if damaged. To install the cover 52, it is simply placed over the body of the toy 50 and tied at the top.

Figure 2:
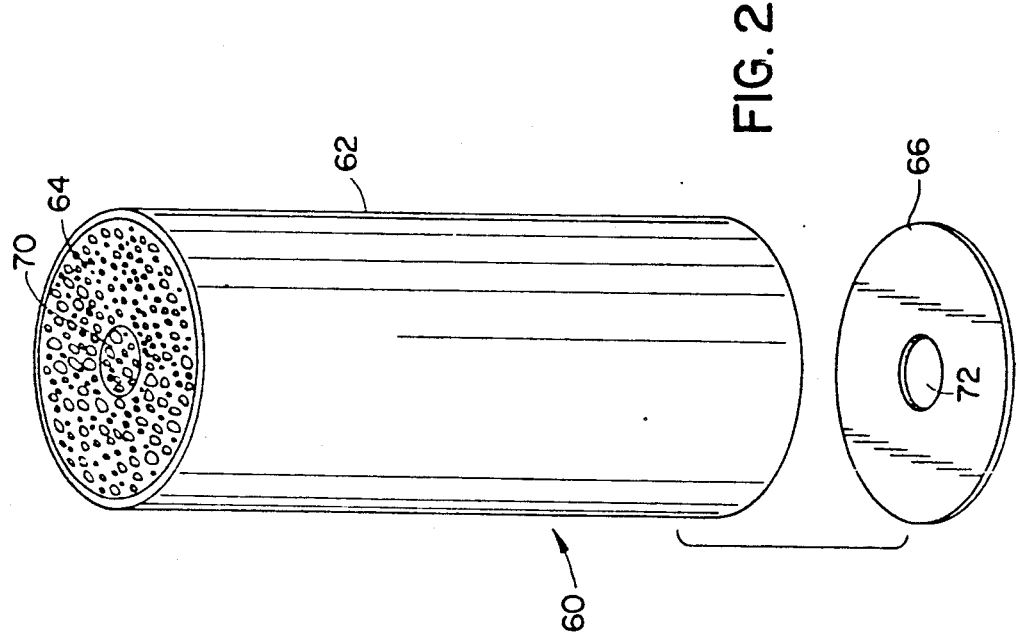
FIG. 2 shows a more detailed view of the inside of the pet exercise device of the present invention.

Turning now to FIG. 2, the body 60 of the toy is shown in greater detail. The body 60 is composed of three basic parts in this embodiment: a cylindrical tube 62, a stuffing 64 and a bottom panel 66. In the present embodiment, the tube 62 forms the main body member and is made of a reinforced rubber or plastic material such as that used for radiator hoses. Such material is available as EPDM hose, 3 ply nylon cotton wrap construction from Amazon Hose, 3950 N. Miami Ave., Miami, Fla. The preferred material for this embodiment is about 3/16 inch thick and has a diameter of approximately four inches. The cylinder is approximately 12 inches long. This material is very durable and can withstand a tremendous amount of physical abuse by a large dog without significant damage. The tube 62 is, however, quite flexible and provides a significant resistance to a dog's bite.

To further enhance the exercise benefit and stability of form of the device, it is stuffed with a stuffing 64 which may be made of a sponge rubber material such as that used to insulate air conditioning pipes and the like. One such material is close cell tubing available from American Rubber Products, Inc., 312 NW 29th St., Miami, Fla. 33127. This material is basically a heavy duty foam or sponge rubber material which is in the shape of a cylinder also. It may be compressed and inserted within the tube 62. When it expands back to it's normal shape, it presses outward on the wall of the tube 62 and remains in place. Of course, if necessary, it can be more permanently fixed in place using adhesives and the like.

A bottom panel 66 may be made of material with the same or similar properties as that of the tube. This panel 66 is a flat doughnut shaped part. It can be secured to the bottom of the tube by any suitable method such as sewing with a heavy duty thread (e.g. heavy monofilament or stranded nylon thread or the like), or bonded using any suitable bonding process.

The main purpose of the bottom panel 66 in this embodiment is to secure the tether 44 to the body of the toy. To do so, the tether passes through an passage 70 in the stuffing 64 and through hole 72 in the bottom panel 66. The tether 44 is then tied in a knot to secure it in place and prevent it from slipping back through the hole 72. Thus, the tether 44 should be of such size that when knotted it will not pass back through the hole 72. Tether 44 is preferably made of three strand nylon rope or the like.

Figure 3:
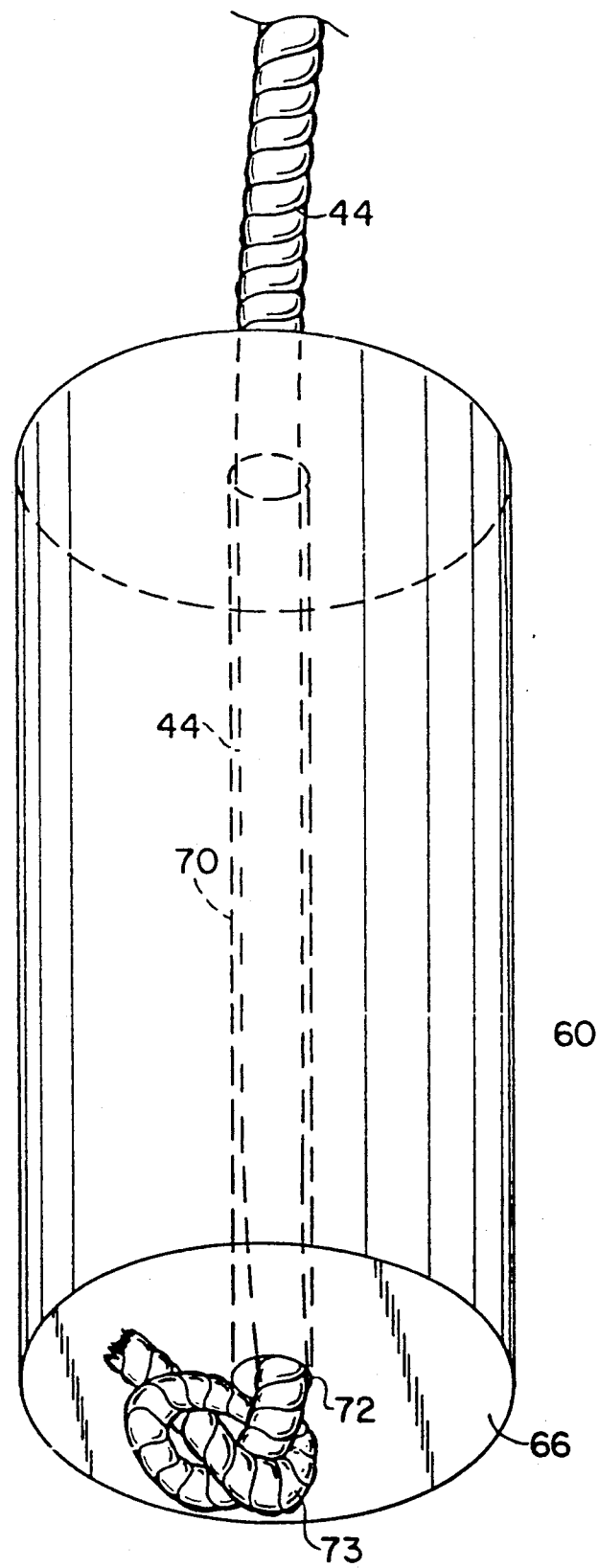
FIG. 3 shows the device of FIG. 2 at an angle showing the lower surface of the device.

FIG. 3 shows another view of the device shown in FIG. 2 in which the assembled bottom panel 66 is shown to have tether 44 passing through passage 70 and hole 72. The body 60 is held in place by a knot 73 placed in the tether 44.

Figure 4:
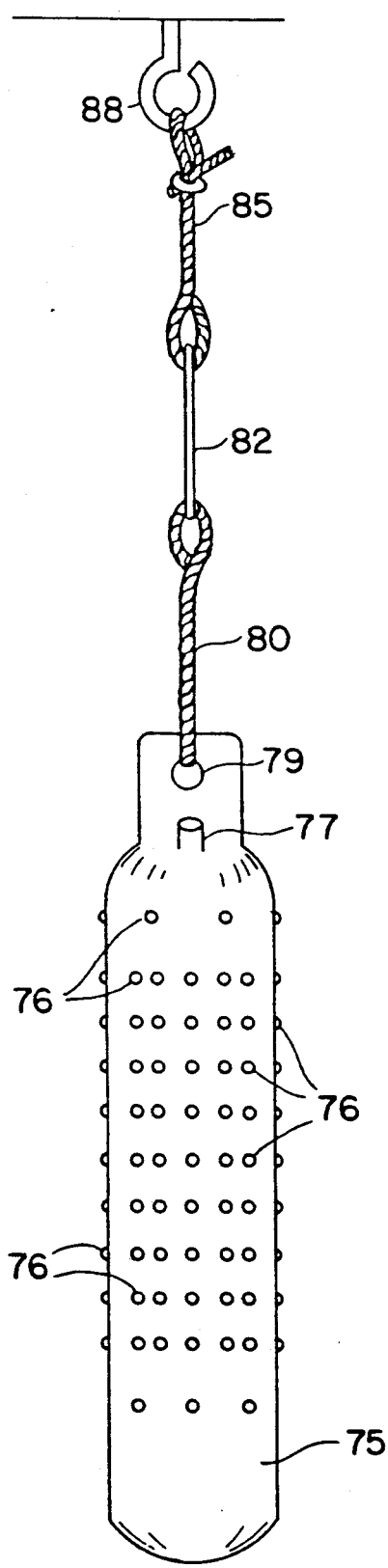
FIG. 4 shows an alternative embodiment of the stuffing and suspension mechanism of the present invention.

Turning now to FIG. 4, an alternative embodiment which is more easily constructed and less expensive to produce is shown. In this embodiment, a commercially available retrieving dummy is used for a body member 75. The preferred retrieving dummy is available from Lucky Dog Equipment, Inc., 18342 Redmond Way, Redmond, Wash. 98052 as the PKD 203 Knobby Dummy #212 black (or other color). This body member is a resilient hollow plastic body approximately 11 inches in length and approximately 2 inches in diameter with a valve 77 to selectively either seal air in or permit the body to breathe. The body is covered with a plurality (approximately 140) of raised bumps 76 on the surface thereof.

At the top, the body includes a molded in aperture 79 suitable for attaching a leader 80 made of ⅜" three line braided rope which can be attached by a braided loop, knot or other suitable means. Approximately two feet of such leader is preferred with the top of the leader attached again either by braided loop, knot, metal ring or the like to a resilient bungee 82 preferably of approximately 21 inches in length. The top of the bungee 82 is connected to another length of ⅜ inch rope 85 which may then be attached to a support mechanism such as an eye hook 88, tree limb, or structure such as that shown in FIG. 1 as desired to suspend the structure at an appropriate height from the ground. Although not shown in this FIGURE, the body member is covered by a similar removable bag-like cover 52 of furry material which is of appropriate size to fit body member 75.

In use, the dog or other pet gains exercise of the jaw and neck muscles by biting and shaking the toy and using the toy somewhat like a punching bag. By securing the toy at various heights, which can be adjusted by placement of the bracket 12, length of the tethers 38 and 44, etc., the dog also gets exercise of other important muscles. If placed high enough, the dog will jump to reach it. The pulling action of the resilient tether 38 will often cause the dog to loose grip of the toy and the dog will chase it. If suspended low enough, the dog will wrestle with it and attempt to pull the toy from the tethers and exercise the leg muscles. Since the dogs seem to become highly involved and entertained in this form of play, the heart and other muscles are also exercised aiding in improvement in the dog's overall health.

Of course, it will be appreciated that the sizes and materials described herein were designed for larger dogs of approximately 50 pounds or more but the sizes and materials may vary considerably without departing from the present invention. By appropriately scaling the sizes and materials, smaller dogs can gain benefit from the present invention. For example, the tube 62 should fit in the mouth of the animal to permit the jaw muscles to be exercised by biting the toy.

It will be evident that similar toys can be constructed using similar materials and differing shapes without departing from the present invention. For example, square, oval or circular shapes can also be used. Other variations will also occur to those skilled in the art.

Thus it is apparent that in accordance with the present invention, an improved apparatus and method that fully satisfies the objectives, aims and advantages is set forth above. While the invention has been described in conjunction with specific embodiments, it is evident that many alternatives, variations, modifications and permutations will become apparent to those skilled in the art in light of the foregoing description. Accordingly, it is intended that the present invention embrace all such alternatives, variations, modifications and permutations as fall within the spirit and broad scope of the appended claims.

What is claimed as new and desired to be secured by Letters Patent is:

1. An exercise and amusement device for a pet, comprising in combination:
   a cylindrical resilient body member suitable for providing resistance against chewing actions by the pet, said resilient body member comprising a flexible tube, a foam stuffing within said flexible tube, and a bottom panel having an aperture covering an open bottom end of said flexible tube;
   resilient suspending means for hanging said body member from above at a predetermined height to permit the body member to swing freely when struck, and for providing elastic resistance to pulling of said body member by the pet, said resilient suspending means including a tether passing through said body member and said aperture and knotted at a bottom side thereof to prevent said tether from passing back through said aperture; and
   removable covering means, for covering said body member.

2. The apparatus of claim 1, wherein said resilient suspending means comprises a first resilient tether coupled to a second tether which is not resilient.

3. The apparatus of claim 1, wherein said removable covering means comprises a fur-like material fashioned into a bag shape.

4. The apparatus of claim 3, wherein said removable covering means further comprises a draw string for closing said bag shape around said body member.

5. The apparatus of claim 1, wherein said flexible tube is made of reinforced rubber hose material.

6. The apparatus of claim 1, further comprising mounting means for suspending said device from a wall.

7. The apparatus of claim 1, wherein said stuffing means is made of a close cell sponge rubber material.

8. A body member for a pet toy, comprising in combination:
   a cylindrical hollow tube made from a flexible resilient material, said hollow tube having a passage from a top end to a bottom end;
   a bottom panel attached to and covering said bottom end to define an inside and an outside of said bottom end, said bottom panel having an aperture;
   a spongy stuffing disposed within said tube to provide resistance to compression of said tube, said stuffing defining a cavity passing through said tube; and
   a tether passing through said bottom panel aperture and said tube's cavity with a knot tied in said tether adjacent said aperture on said outside of said bottom end thereof.

9. The apparatus of claim 8, further comprising a removable fur cover.

10. The apparatus of claim 9, wherein said removable fur cover is fashioned in the shape of a bag.

11. An exercise and amusement device for a pet, comprising in combination:
    a cylindrical resilient body member suitable for providing resistance against chewing actions by the pet, said resilient body member comprising a flexible hollow tube, a foam stuffing within said flexible hollow tube, and a bottom panel having an aperture covering a bottom end of said flexible hollow tube;
    a first tether passing through said aperture and said body member and knotted at a bottom side of said bottom panel to prevent said tether from passing back through said aperture;
    resilient suspending means comprising a second resilient tether coupled to said first tether for suspending said body member at a predetermined height, and for providing elastic resistance to pulling of said body member by the pet; and;
    removable covering means fashioned into the shape of a bag and made of a fur-like material, for covering said body member; and
    a draw string for closing said bag shape around said body member.

12. An exercise device for pets, comprising in combination:
    a resilient body member suitable for providing resistance against chewing actions by the pet, said body member comprising a hollow flexible cylinder with a bottom panel and an aperture in said bottom panel;
    a tether passing through said hollow flexible cylinder and through said aperture with a knot adjacent said bottom panel to prevent passage of said tether completely through said aperture;
    stuffing means, disposed within said body member, for providing additional resistance against chewing actions by said pet;
    resilient suspending means coupled to said tether for suspending said body member at a predetermined height, and for providing elastic resistance to pulling of said body member by the pet; and
    removable covering means, for covering said body member.

13. The apparatus of claim 12, wherein said covering means is made of a fur-like material.

14. The apparatus of claim 11, wherein said stuffing means is made of a close cell sponge rubber material.

* * * * *